(12) United States Patent
Ross et al.

(10) Patent No.: US 8,894,844 B2
(45) Date of Patent: Nov. 25, 2014

(54) HYDROPROCESSING METHODS UTILIZING CARBON OXIDE-TOLERANT CATALYSTS

(75) Inventors: April D. Ross, Beaumont, TX (US); Thomas R. Halbert, Baton Rouge, LA (US); William J. Novak, Bedminster, NJ (US); John P. Greeley, Gaithersburg, MD (US)

(73) Assignee: ExxonMobil Research and Engineering Company, Annandale, NJ (US)

( * ) Notice: Subject to any disclaimer, the term of this patent is extended or adjusted under 35 U.S.C. 154(b) by 165 days.

(21) Appl. No.: 13/424,683

(22) Filed: Mar. 20, 2012

(65) Prior Publication Data

US 2012/0241360 A1 Sep. 27, 2012

Related U.S. Application Data

(60) Provisional application No. 61/454,776, filed on Mar. 21, 2011.

(51) Int. Cl.
| | | |
|---|---|---|
| *C10G 45/08* | (2006.01) | |
| *C10G 45/04* | (2006.01) | |
| *C10G 65/04* | (2006.01) | |
| *B01J 21/08* | (2006.01) | |
| *C10G 69/04* | (2006.01) | |
| *B01J 35/10* | (2006.01) | |
| *B01J 23/882* | (2006.01) | |

(52) U.S. Cl.
CPC ............ *C10G 65/04* (2013.01); *B01J 35/1047* (2013.01); *B01J 23/882* (2013.01); *C10G 45/08* (2013.01); *B01J 21/08* (2013.01); *B01J 35/1061* (2013.01); *C10G 69/04* (2013.01); *C10G 2300/1044* (2013.01); *B01J 35/1042* (2013.01); *C10G 2300/202* (2013.01)
USPC ... 208/209; 208/216 R; 208/217; 208/216 PP (58) Field of Classification Search
CPC ...... B01J 21/08; B01J 23/882; B01J 35/1042; B01J 35/1047; B01J 35/1061; C10G 2300/1044; C10G 2300/202; C10G 45/08; C10G 65/04; C10G 69/04
USPC .......... 208/177, 208 R, 209, 210, 213, 216 R, 208/216 RR, 217, 216 PP
See application file for complete search history.

(56) References Cited

U.S. PATENT DOCUMENTS

| 5,985,136 | A | 11/1999 | Brignac et al. |
| 6,013,598 | A | 1/2000 | Lapinski et al. |

(Continued)

FOREIGN PATENT DOCUMENTS

| WO | WO2007/084471 | * 7/2007 | ............ C10G 45/08 |
| WO | 2011031828 | 3/2011 | |

*Primary Examiner* — Walter D Griffin
*Assistant Examiner* — Derek Mueller
(74) *Attorney, Agent, or Firm* — David M. Weisberg; Chad A. Guice (57) ABSTRACT

The invention includes a hydrotreating method for increased CO content comprising: contacting an olefinic naphtha feedstream with a hydrogen-containing treat gas stream and a hydrotreating catalyst in a reactor under hydrotreating conditions sufficient to at least partially hydrodesulfurize and/or hydrodenitrogenate the feedstream, wherein the feedstream and the hydrogen-containing treat gas stream collectively have greater than 10 vppm CO content and/or wherein the reactor inlet sees an average CO concentration of greater than 10 vppm, wherein the hydrotreating catalyst comprises a catalyst having cobalt and molybdenum disposed on a silica-based support, and wherein the hydrotreating conditions are selected such that the catalyst has a relative HDS activity at least 10% greater than an identical catalyst under identical conditions except for a collective CO content of the feedstream and/or hydrogen-containing treat gas being <10 vppm and/or a reactor inlet CO content <10 vppm.

34 Claims, 1 Drawing Sheet

(56) References Cited

U.S. PATENT DOCUMENTS

| | | |
|---|---|---|
| 6,126,814 A | 10/2000 | Lapinski et al. |
| 6,231,753 B1 | 5/2001 | McKnight et al. |
| 6,231,754 B1 | 5/2001 | Brignac et al. |
| 6,596,157 B2 | 7/2003 | Gupta et al. |
| 6,610,197 B2 | 8/2003 | Stuntz et al. |
| 6,843,905 B2 | 1/2005 | Stuntz et al. |
| 6,893,554 B2 | 5/2005 | Brignac et al. |
| 6,913,688 B2 | 7/2005 | Coker et al. |
| 7,297,251 B2 | 11/2007 | Ellis et al. |
| 7,422,679 B2 * | 9/2008 | Ellis et al. .................... 208/217 |
| 7,576,023 B2 | 8/2009 | Brignac et al. |
| 8,216,958 B2 | 7/2012 | Wu et al. |
| 8,236,723 B2 | 8/2012 | Timmer et al. |
| 2001/0027163 A1 | 10/2001 | Khare |
| 2003/0034276 A1 | 2/2003 | Pradhan et al. |
| 2004/0262200 A1 | 12/2004 | Sughure, II et al. |
| 2006/0019826 A1 | 1/2006 | Brignac et al. |
| 2006/0135829 A1 | 6/2006 | Picard et al. |
| 2006/0151359 A1 | 7/2006 | Ellis et al. |
| 2008/0161614 A1 | 7/2008 | Bertoncini et al. |
| 2009/0166263 A1 | 7/2009 | Brignac et al. |
| 2009/0321320 A1 | 12/2009 | Wu et al. |
| 2010/0012554 A1 | 1/2010 | Bai et al. |
| 2010/0320123 A1 | 12/2010 | Wu et al. |

\* cited by examiner

HYDROPROCESSING METHODS UTILIZING CARBON OXIDE-TOLERANT CATALYSTS

CROSS-REFERENCE TO RELATED APPLICATION

This application claims priority to U.S. Provisional Application Ser. No. 61/454,776 filed Mar. 21, 2011, which is herein incorporated by reference in its entirety.

FIELD

The present invention relates to methods of hydroprocessing an olefinic naphtha feed involving use of a combination of a hydrotreating catalyst that behaves well in carbon monoxide-containing and/or carbon dioxide-containing environments with an unusually increased level of carbon monoxide and/or carbon dioxide, for example in the hydrogen-containing treat gas and/or in the olefinic naphtha feed.

BACKGROUND

Most sulfur in the refinery motor gasoline pool generally comes from FCC gasoline. The FCC gasoline (or "naphtha") can be hydrotreated to remove sulfur. However, FCC gasoline tends to be olefinic, and conventional hydrotreating can often result in too large of an octane loss, due to near complete olefin saturation. Selective hydrotreating processes have been developed, e.g., SCANfining, to maintain higher relative hydrodesulfurization with reduced (optimally minimal) olefin saturation, by a combination of specific catalyst and operation in a narrow range of optimized operating conditions. Since the operating window in SCANfining can tend to be narrow, any contaminants to the process can tend to be very significant in this technology.

One potential source of contaminants into the hydrotreatment process can be from makeup hydrogen, typically from a steam-reforming hydrogen plant or from a catalytic reformer. It has been found that some of these streams can contain carbon monoxide in surprisingly high levels, which can act to suppress activity/selectivity in the FCC gasoline hydrotreating process, requiring higher required reactor temperatures to overcome this suppression. Carbon monoxide can also tend to buildup in the recycle gas system, such that the effective concentration in the reactor is higher than the concentration in the makeup hydrogen itself. Higher operating temperatures both narrow the operating window (resulting in lower cycle length) and saturate more olefins (resulting in higher octane loss). In order to prevent deactivation of the catalysts and/or reduction in the process hydrodesulfurization levels, in conventional SCANfining processes, the carbon monoxide contents of the naphtha feedstream, and particularly the hydrogen gas streams, to the SCANfining reactor(s) have been maintained at target carbon monoxide levels to less than 5 vppm.

Carbon dioxide can additionally be present in makeup hydrogen streams. $CO_2$ generally has less effect itself, as most selective FCC gasoline HDS units have amine recycle gas scrubbers that remove $CO_2$ in the recycle gas. However, it is known that some $CO_2$ will be converted to CO over many hydrotreatment catalysts.

Thus, it would be desirable to identify catalysts that are tolerant of carbon monoxide (and/or carbon dioxide) and/or that convert less carbon dioxide to carbon monoxide during the hydrotreatment process. Included below are methods of utilizing such catalysts in methods where carbon oxides are prevalent, in order to improve the effectiveness and/or efficiency of the methods, e.g., for making motor gasoline and perhaps other fuels/petroleum products as well.

SUMMARY OF EMBODIMENTS OF THE INVENTION

One embodiment of the invention relates to a method of hydrotreating an olefinic naphtha feedstream in the presence of an increased carbon monoxide content, the method comprising:

contacting a first olefinic naphtha feedstream with a first hydrogen-containing treat gas stream in the presence of a first hydrotreating catalyst in a first hydrotreating reactor under first hydrotreating conditions sufficient to at least partially hydrodesulfurize and/or hydrodenitrogenate the first olefinic naphtha feedstream to produce a first hydrotreated olefinic naphtha product stream;

wherein the first olefinic naphtha feedstream and the first hydrogen-containing treat gas stream collectively have a carbon monoxide content of greater than 10 vppm; and wherein the first hydrotreating catalyst comprises cobalt and molybdenum disposed on a silica-based support.

Alternatively, the embodiment can further comprise wherein the first hydrotreating conditions are selected such that the first hydrotreating catalyst has a first relative hydrodesulfurization activity that is at least 10% greater than that of an identical catalyst under identical conditions except that the identical conditions include a collective carbon monoxide content of the first olefinic naphtha feedstream and first hydrogen-containing treat gas being less than 10 vppm.

In an embodiment, the first olefinic naphtha feedstream is comprised of an FCC naphtha. In a preferred embodiment, the silica-based support comprises at least 85 wt % silica. In another embodiment, the first hydrotreating catalyst has a cobalt content from about 2 wt % to about 7 wt %, measured as oxide and based on total weight of the catalyst, and a molybdenum content from about 7 wt % to about 25 wt %, measured as oxide and based on total weight of the catalyst.

In another embodiment, the process further comprises contacting at least a portion of the first hydrotreated olefinic naphtha product stream with a second hydrogen-containing treat gas stream in the presence of a second hydrotreating catalyst in a second hydrotreating reactor under second hydrotreating conditions sufficient to at least partially hydrodesulfurize and/or hydrodenitrogenate the first hydrotreated olefinic naphtha product stream to produce a second hydrotreated olefinic naphtha product stream.

In alternate embodiments comprising both a first and a second hydrotreating catalyst, the second hydrotreating catalyst may have a cobalt content from about 0.1 wt % to about 5 wt %, measured as oxide and based on total weight of the catalyst, and a molybdenum content from about 1 wt % to about 10 wt %, measured as oxide and based on total weight of the catalyst. In yet other embodiments, the second hydrotreating catalyst may have an average pore volume between about 0.5 cc/g and about 1.5 cc/g and an average pore diameter in the range of about 60 Å to 200 Å. In other preferred embodiments, the second hydrotreating catalyst may be comprised of an alumina-based support wherein the alumina-based support contains at least 85 wt % alumina.

DETAILED DESCRIPTION OF THE EMBODIMENTS

One aspect of the invention relates to a method of hydrotreating an olefinic naphtha feedstream in the presence of an increased carbon monoxide content. The hydrotreating method advantageously comprises contacting the olefinic naphtha feedstream with a hydrogen-containing treat gas stream in the presence of a hydrotreating catalyst in a reactor (having a reactor inlet) under hydrotreating conditions sufficient to at least partially hydrodesulfurize, hydrodenitrogenate, and/or hydrodeoxygenate the olefinic naphtha feedstream.

Advantageously in one embodiment, the combined olefinic naphtha feedstream and the hydrogen-containing treat gas stream to the first hydrodesulfurization reactor can collectively have an increased carbon monoxide content (e.g., greater than 10 vppm). In one such embodiment, for example, the hydrogen-containing treat gas stream can have a carbon monoxide content from greater than 15 vppm, or greater than greater than 25 vppm, or even greater than 50 vppm. Additionally or alternately in such embodiments, the reactor inlet, through which the olefinic naphtha feedstream and the hydrogen-containing treat gas stream collectively flow into the reactor, can see an average carbon monoxide concentration greater than 10 vppm (e.g., the reactor inlet can see a carbon monoxide content from 10 vppm to 500 vppm). Obviously, in the previous embodiment, the olefinic naphtha feedstream and the hydrogen-containing treat gas stream collectively flowing through the reactor inlet indicates co-current reactor flow. However, countercurrent reactor flow, where the hydrogen-containing treat gas stream flows in the opposite direction from the olefinic naphtha feedstream flowing through the reactor inlet, can be a possible alternative configuration. In such countercurrent configurations, particularly where the increased carbon monoxide concentration is present predominantly in the hydrogen-containing treat gas stream, the reactor inlet may generally not see average carbon monoxide concentrations above 10 vppm.

Reactor/catalyst configurations of the embodiments of the invention herein can include, but are not limited to, a single hydrotreating reactor with a first hydrotreating catalyst as described, or alternatively, a single hydrotreating reactor containing both a first hydrotreating catalyst and a second hydrotreating catalyst wherein the two catalysts are in a "stacked configuration" within the single hydrotreating reactor, or alternatively, with two hydrotreating reactors arranged in series flow with a first hydrotreating catalyst in the first hydrotreating reactor and a second hydrotreating catalyst in the second hydrotreating reactor. The catalysts and process conditions of the systems of the invention can be as further described herein.

Olefinic naphtha feedstreams to be hydroprocessed (hydrotreated) according to the methods of the present invention can contain levels of heteroatoms, such as sulfur, nitrogen, and/or oxygen, that are unsuitable for certain/desired uses, e.g., as fuel compositions and/or as blending streams for fuel compositions, and that can be appropriately improved through hydrotreatment. Though unsuitable levels of heteroatoms can vary, depending upon the heteroatom and upon the desired use of the feedstream material, the olefinic naphtha feedstreams to be hydroprocessed (hydrotreated) according to the methods of the present invention can include, but are not limited to FCC naphtha, steam cracker naphtha, coker naphtha, visbreaker naphtha, and the like, and combinations thereof.

Hydrogen-containing treat gas streams can advantageously contain enough hydrogen gas to (catalytically) effect a hydrodesulfurization and/or hydrodenitrogenation reaction, as necessary to remove the desired amount(s) of heteroatoms from the olefinic naphtha feedstream. Almost all (catalytic) hydrotreatment reactions herein can occur when the treat gas stream contains at least 75 vol % hydrogen gas, for example at least 80 vol %, at least 85 vol %, at least 90 vol %, at least 95 vol %, at least 96 vol %, at least 97 vol %, at least 98 vol %, at least 99 vol %, at least 99.5 vol %, at least 99.7 vol %, at least 99.8 vol %, or at least 99.9 vol %. Additionally, the treat gas stream can contain up to 100 vol % hydrogen gas, for example up to 99.99 vol %, up to 99.95 vol %, up to 99.9 vol %, up to 99.8 vol %, up to 99.7 vol %, up to 99.5 vol %, up to 99 vol %, up to 98 vol %, up to 97 vol %, up to 96 vol %, up to 95 vol %, up to 90 vol %, up to 85 vol %, or up to 80 vol %. In alternate embodiments, which may occur in combination with specially designed hydrotreating catalysts, the amount of hydrogen gas in the treat gas stream can be lower than 75 vol %. See, for example, commonly assigned co-pending U.S. Ser. Nos. 12/836,771, 12/869,393, and 12/878,351, the entire disclosures of which are hereby incorporated by reference herein.

Hydrotreating catalysts particularly useful in the methods according to the present invention are carbon monoxide-tolerant catalysts. Without being bound by theory, it is believed that catalysts having increased carbon monoxide tolerance can allow higher heteroatom removal (e.g., HDS and/or HDN) activity than for less CO-tolerant catalysts in a CO-containing atmosphere at similar reaction conditions, less severe conditions during a hydrotreatment method (e.g., because such carbon monoxide-tolerant catalysts can maintain activity with less deactivation in the presence of carbon monoxide more easily without increasing temperature, for instance), and/or can extend cycle length of a hydrotreatment process (e.g., again because such carbon monoxide-tolerant catalysts can maintain activity with less deactivation in the presence of carbon monoxide for longer time periods than more conventional, less CO-tolerant catalysts). Furthermore, carbon monoxide is a known suppressant of heteroatom removal activity in certain hydrotreatment catalysts, which can thus additionally reduce the selectivity of such hydrotreatment catalysts for heteroatom removal, for example in relation to hydrogenation of unsaturations (e.g., double bonds), in the olefinic naphtha feedstream. Again without being bound by theory, it is believed that catalysts with improved carbon monoxide tolerance can additionally or alternately allow better control of heteroatom removal selectivity, and thus better control of octane loss in naphtha/gasoline hydrotreatment, compared to less CO-tolerant catalysts, e.g., due to lower hydrogenation at similar heteroatom removal activity (such as with less severe reaction conditions and/or over longer times) and/or due to similar hydrogenation at higher heteroatom removal activity (such as with similar reaction conditions and/or over longer times).

Such particularly useful CO-tolerant catalysts can include, but are not limited to, those comprising at least one metal from Group VIII of the Periodic Table of the Elements (e.g., nickel and/or cobalt, preferably including cobalt) and at least one metal from Group VIB of the Periodic Table of the Elements (e.g., molybdenum and/or tungsten, such as molybdenum). The Group VIII/VIB metals can optionally be present in a bulk catalyst form, again optionally with no more than 25 wt % of a sufficient binder (e.g., silica, alumina, silica-alumina, titania, or the like, or a combination thereof). Alternately, and preferably, the Group VIII/VIB metals can be disposed on a support material. Exemplary support materials can include, but are not limited to, silica, alumina, silica-alumina, titania, or the like, or a combination thereof, for example non-alumina supports including at least silica.

In a supported metals embodiment, the carbon monoxide-tolerant hydrotreating catalyst (or also referred to herein as the "first hydrotreating catalyst") preferably has a cobalt content from about 2 wt % to about 7 wt %, measured as oxide and based on total weight of the catalyst, and a molybdenum content from about 7 wt % to about 25 wt %, measured as oxide and based on total weight of the catalyst. The carbon monoxide-tolerant hydrotreating catalyst preferably comprises a silica-based support. By the term "silica based support" it is meant herein that the catalyst support contains at least 85 wt % silica based on the weight of the support. In preferred embodiments, the carbon monoxide-tolerant hydrotreating catalyst comprises a silica-based support containing at least 90 wt %, or 95 wt %, silica. In preferred embodiments, the carbon monoxide-tolerant hydrotreating catalyst further comprises an average pore volume between about 0.6 cc/g and about 2.0 cc/g and an average pore diameter in the range of about 200 Å to 2000 Å. In other embodiments, the carbon monoxide-tolerant hydrotreating catalyst can further comprise at least one organic additive or component.

Typical (or "effective") hydrotreating conditions for an olefinic naphtha feed can include one or more of a weight average bed temperature from about 225° C. to about 400° C., a pressure from about 100 psig (about 0.7 MPa) to about 1500 psig (about 10.3 MPa), an LHSV from about 0.2 $hr^{-1}$ to about 20 $hr^{-1}$, and a hydrogen treat gas rate from about 250 scf/bbl (about 43 $Nm^3/m^3$) to about 10000 scf/bbl (about 1700 $Nm^3/m^3$). It is preferred that the effective hydrotreating conditions be selected such as to obtain an at least partially hydrodesulfurized and/or at least partially hydrodenitrogenated olefinic naphtha product stream from the catalytic reactions thereof.

In a preferred embodiment, the hydrotreating conditions can be selected such that the carbon monoxide-tolerant hydrotreating catalyst can have a relative hydrodesulfurization (HDS) activity that is at least 10% greater (e.g., at least 15% greater, at least 20% greater, or at least 25% greater; additionally or alternately, up to 75% greater, up to 50% greater, up to 40% greater, or up to 30% greater) than that of the identical catalyst under identical conditions with at least one of the following two exceptions: in situations where the ("first") olefinic naphtha feedstream and the ("first") hydrogen-containing treat gas stream collectively have a carbon monoxide content from 10 vppm to 100 vppm, the relative HDS activity should be compared to the situation in which the ("first") olefinic naphtha feedstream and ("first") hydrogen-containing treat gas has a collective carbon monoxide content less than 10 vppm (for example less than 7 vppm, less than 5 vppm, less than 3 vppm, or less than 1 vppm); and similarly, in situations where the reactor inlet, through which the ("first") olefinic naphtha feedstream and the ("first") hydrogen-containing treat gas stream collectively flow into the reactor, saw an average carbon monoxide concentration greater than 10 vppm, the relative HDS activity should be compared to the situation in which the reactor inlet sees a carbon monoxide content of less than 10 vppm (for example less than 7 vppm, less than 5 vppm, less than 3 vppm, or less than 1 vppm).

Relative HDS activity, as used herein, should be understood to be on a volumetric basis, based on a reference activity. For instance, a reference activity is based on a given volume of a reference catalyst at a certain set of hydrotreatment conditions (e.g., temperature, pressure, treat gas rate, etc.), and a volumetric relative HDS activity of a comparative catalyst/reaction (i.e., either of another catalyst at identical conditions or of the same catalyst at different conditions) can be expressed as a ratio of the volume of comparative catalyst necessary to attain the same heteroatom (e.g., sulfur) content in the hydrotreated product, relative to the reference catalyst/conditions.

Another aspect of the invention relates to a method of hydroprocessing an olefinic naphtha feedstream in the presence of an increased $CO_x$ content. As used herein, the term "$CO_x$ content," in reference to a stream, should be understood to mean the sum of carbon monoxide content plus the carbon dioxide content of that stream. The hydroprocessing method advantageously comprises contacting the olefinic naphtha feedstream with a hydrogen-containing treat gas stream in the presence of a combination of a first hydrotreating catalyst and a second hydrotreating catalyst in a reactor system (which may include only one reactor having a reactor inlet, or which may alternately include two or more reactors such that the reactor system has an initial reactor inlet that is typically the first reactor inlet) under hydrotreating conditions sufficient to at least partially hydrodesulfurize and/or hydrodenitrogenate the olefinic naphtha feedstream.

Advantageously in one embodiment, the olefinic naphtha feedstream and the hydrogen-containing treat gas stream can collectively have a $CO_x$ content from 15 vppm to 550 vppm. In one such embodiment, for example, the hydrogen-containing treat gas stream can have a carbon dioxide content from 20 vppm to 500 vppm and/or a carbon monoxide content from 15 vppm to 50 vppm. Additionally or alternately in such embodiments, the reactor inlet or initial reactor inlet, through which the olefinic naphtha feedstream and the hydrogen-containing treat gas stream collectively flow into the reactor, can see an average concentration of $CO_x$ from 10 vppm to 550 vppm (e.g., the reactor inlet can see a carbon monoxide content from 10 vppm to 45 vppm and/or a carbon dioxide content from 15 vppm to 450 vppm). Obviously, in the previous embodiment, the olefinic naphtha feedstream and the hydrogen-containing treat gas stream collectively flowing through the reactor inlet or initial reactor inlet indicates co-current reactor flow. However, countercurrent reactor flow, where the hydrogen-containing treat gas stream flows in the opposite direction from the olefinic naphtha feedstream flowing through the reactor inlet, can be a possible alternative configuration. In such countercurrent configurations, particularly where the increased $CO_x$ concentration is present predominantly in the hydrogen-containing treat gas stream, the reactor inlet or the initial reactor inlet may generally not see average carbon monoxide concentrations above 5 vppm and/or average carbon dioxide concentrations above 15 vppm.

The first olefinic naphtha feedstream, first hydrogen-containing treat gas stream, and first hydrotreating catalyst can all be similar to those described in the previous aspect of the invention, hereinabove. The second hydrotreating catalyst can generally be any conventional hydrotreating catalyst but, in one embodiment, can be a catalyst comprising cobalt and molybdenum on an alumina-based support. By the term "alumina-based support" it is meant herein that the catalyst support contains at least 85 wt % alumina based on the weight of the support. In preferred embodiments, the second hydrotreating catalyst comprises an alumina-based support containing at least 90 wt %, or 95 wt %, alumina.

In an embodiment, the second hydrotreating catalyst has a cobalt content of about 0.1 to about 5 wt %, or even about 0.5 to about 3 wt %, of cobalt as measured as an oxide and based on the total weight of the catalyst, and a molybdenum content of about 1 to about 10 wt %, or even about 3 to about 6 wt %, of molybdenum, as measured as an oxide and based on the total weight of the catalyst. In an embodiment, the second hydrotreating catalyst has an average pore volume between about 0.5 cc/g and about 1.5 cc/g, or even 0.6 cc/g and about 1.0 cc/g, and an average pore diameter in the range of about 60 Å to 200 Å, or even 75 Å to 150 Å.

Without being bound by theory, it is believed that catalysts having increased carbon monoxide tolerance can allow higher heteroatom removal (e.g., HDS, HDN, and/or HDO) activity than for less CO-tolerant catalysts in a CO-containing atmosphere at similar reaction conditions, less severe conditions during a hydrotreatment method (e.g., because such carbon monoxide-tolerant catalysts can maintain activity with less deactivation in the presence of carbon monoxide more easily without increasing temperature, for instance), and/or can extend cycle length of a hydrotreatment process (e.g., again because such carbon monoxide-tolerant catalysts can maintain activity with less deactivation in the presence of carbon monoxide for longer time periods than more conventional, less CO-tolerant catalysts). Furthermore, carbon monoxide is a known suppressant of heteroatom removal activity in certain hydrotreatment catalysts, which can thus additionally reduce the selectivity of such hydrotreatment catalysts for heteroatom removal, for example in relation to hydrogenation of unsaturations (e.g., double bonds), in the olefinic naphtha feedstream. Again without being bound by theory, it is believed that catalysts with increased carbon monoxide tolerance can additionally or alternately allow better control of heteroatom removal selectivity, and thus better control of octane loss in naphtha/gasoline hydrotreatment, compared to less CO-tolerant catalysts, e.g., due to lower hydrogenation at similar heteroatom removal activity (such as with less severe reaction conditions and/or over longer times) and/or due to similar hydrogenation at higher heteroatom removal activity (such as with similar reaction conditions and/or over longer times). Further without being bound by theory, it is believed that catalysts that are more $CO_x$-tolerant, e.g., that can convert less carbon dioxide to carbon monoxide during the first hydrotreatment reaction, can cause a benefit not only from carbon monoxide-tolerance of the first hydrotreating catalyst itself but also from exposing the relatively carbon monoxide-intolerant second hydrotreating catalyst, which is going to later contact the effluent (at least partially hydrotreated product) from the hydrotreating zone/reactor, to a lower carbon monoxide content. Such lower CO content in the effluent can then thus result in higher activity of the second hydrotreating catalyst, less difficulty in maintaining a similar catalytic activity and/or cycle length, less severe conditions necessary in the reactor/zone containing the second hydrotreating catalyst, and/or increased cycle length of the second hydrotreating catalyst.

Typically, the second hydrotreating catalyst can generally be a less carbon monoxide-tolerant catalyst than the first hydrotreating catalyst, e.g., can be a conventional hydrotreating catalyst. Such different hydrotreating catalysts can include, but are not limited to, those comprising at least one metal from Group VIII of the Periodic Table of the Elements (e.g., nickel and/or cobalt, preferably including cobalt) and at least one metal from Group VIB of the Periodic Table of the Elements (e.g., molybdenum and/or tungsten, such as molybdenum). The Group VIII/VIB metals can optionally be present in a bulk catalyst form, again optionally with no more than 25 wt % of a sufficient binder (e.g., silica, alumina, silica-alumina, titania, or the like, or a combination thereof). Alternately, the Group VIII/VIB metals can be disposed on a support material. Exemplary support materials can include, but are not limited to, silica, alumina, silica-alumina, titania, or the like, or a combination thereof, for example including at least silica.

Unlike with the first hydrotreating catalyst herein, the support of the second hydrotreating catalyst can, in some embodiments, include or be alumina. Further, in some embodiments, the second hydrotreating catalyst can have a cobalt content from about 0.1 wt % to about 5 wt %, measured as oxide and based on total weight of the catalyst, and a molybdenum content from about 1 wt % to about 10 wt %, measured as oxide and based on total weight of the catalyst.

According to the hydroprocessing methods of the present invention utilizing two or more catalysts, the first hydrotreating catalyst and the second hydrotreating catalyst can advantageously be oriented in the reactor system in a stacked configuration, such that the olefinic naphtha feedstream and the hydrogen-containing treat gas stream can collectively contact the first hydrotreating catalyst before the second hydrotreating catalyst. As before, in such embodiments, the olefinic naphtha feedstream and the hydrogen-containing treat gas stream collectively flowing through the reactor inlet (single reactor case) or the initial reactor inlet (multiple reactor case) indicates co-current flow. In such co-current flow schemes, the carbon monoxide-tolerant (first) hydrotreating catalyst should be contacted first, as this catalyst can typically be more capable than the second hydrotreating catalyst of tolerating the higher $CO_x$ concentrations present at the (initial) reactor inlet, with the second hydrotreating catalyst thus being oriented furthest from the (initial) reactor inlet.

However, countercurrent flow, where the hydrogen-containing treat gas stream flows in the opposite direction from the olefinic naphtha feedstream flowing through the reactor inlet or the initial reactor inlet, can be a possible alternative configuration. In such countercurrent configurations, it can be important to further characterize the source of the increased $CO_x$ concentration, so that the appropriate configuration can be applied in the reactor system. For instance, in countercurrent configurations where the increased $CO_x$ concentration is present predominantly in the hydrogen-containing treat gas stream, the reactor inlet or the initial reactor inlet may not see average carbon monoxide concentrations above 5 vppm and/or average carbon dioxide concentrations above 15 vppm, thus indicating a preference for the carbon monoxide-tolerant (first) hydrotreating catalyst to be disposed nearest the entry of the hydrogen-containing treat gas stream, e.g., away from the (initial) reactor inlet, with the second hydrotreating catalyst disposed furthest from the entry of the hydrogen-containing treat gas stream, e.g., nearest the (initial) reactor inlet. Conversely, in countercurrent configurations where the increased $CO_x$ concentration is present predominantly in the olefinic naphtha feedstream, the (initial) reactor inlet can generally see average carbon monoxide concentrations of at least 10 vppm and/or average carbon dioxide concentrations of at least 20 vppm, thus indicating a preference for the same configuration as in the co-current flow situation, with the first hydrotreating catalyst being oriented nearest the (initial)

reactor inlet and with the second hydrotreating catalyst being oriented furthest from the (initial) reactor inlet.

In the hydroprocessing methods according to the present invention, the second hydrotreating conditions can be similar to the first hydrotreating conditions described herein. Further, in embodiments where the at least one other hydroprocessing catalyst is present within the same (a single) reactor, the second hydrotreating conditions generally will not vary much from the first hydrotreating conditions, notably even if there are independent conditional controls (e.g., temperature, pressure, etc.) for each reaction stage, because the housing within the same reactor can make it rather difficult to subject two different stacked catalysts to significantly different reaction conditions. However, in multiple reactor situations, the conditions surrounding the second hydrotreating catalyst can be similar to or markedly different from the first hydrotreating conditions, as noted herein.

In a preferred embodiment, the hydrotreating conditions can be selected such that the carbon monoxide-tolerant (first) hydrotreating catalyst can have a relative hydrodesulfurization (HDS) activity that is at least 10% greater (e.g., at least 15% greater, at least 20% greater, or at least 25% greater; additionally or alternately, up to 75% greater, up to 50% greater, up to 40% greater, or up to 30% greater) than that of the identical catalyst under identical conditions with at least one of the following two exceptions: in situations where the olefinic naphtha feedstream and the hydrogen-containing treat gas stream collectively have a carbon monoxide content greater than 10 vppm, the relative HDS activity should be compared to the situation in which the olefinic naphtha feedstream and hydrogen-containing treat gas has a collective carbon monoxide content less than 10 vppm (for example less than 7 vppm, less than 5 vppm, less than 3 vppm, or less than 1 vppm); and, in situations where the reactor inlet, through which the olefinic naphtha feedstream and the hydrogen-containing treat gas stream collectively flow into the reactor, saw an average carbon monoxide concentration greater than 10 vppm, the relative HDS activity should be compared to the situation in which the reactor inlet sees a carbon monoxide content of less than 10 vppm (for example less than 7 vppm, less than 5 vppm, less than 3 vppm, or less than 1 vppm). Additionally or alternately in this preferred embodiment, the hydrotreating conditions can be selected such that the carbon monoxide-tolerant hydrotreating catalyst can convert at least 5% less carbon dioxide (e.g., at least 7% more, at least 8% more, or at least 10% more carbon dioxide; additionally or alternately, up to 75% less, up to 50% less, up to 40% less, up to 30% less, or up to 25% less carbon dioxide) to carbon monoxide than the at least one other hydroprocessing catalyst at the same hydrotreating conditions. The other hydroprocessing catalyst can be the hydroprocessing catalyst utilized as the second hydrotreating catalyst described herein.

Additionally or alternately, the present invention includes one or more of the following embodiments.

Embodiment 1. A method of hydrotreating an olefinic naphtha feedstream in the presence of an increased carbon monoxide content, the method comprising:

contacting a first olefinic naphtha feedstream with a first hydrogen-containing treat gas stream in the presence of a first hydrotreating catalyst in a first hydrotreating reactor under first hydrotreating conditions sufficient to at least partially hydrodesulfurize and/or hydrodenitrogenate the first olefinic naphtha feedstream to produce a first hydrotreated olefinic naphtha product stream;

wherein the first olefinic naphtha feedstream and the first hydrogen-containing treat gas stream collectively have a carbon monoxide content of greater than 10 vppm; and wherein the first hydrotreating catalyst comprises cobalt and molybdenum disposed on a silica-based support.

Embodiment 2. The method of embodiment 1 wherein the first hydrotreating conditions are selected such that the first hydrotreating catalyst has a first relative hydrodesulfurization activity that is at least 10% greater than that of an identical catalyst under identical conditions except that the identical conditions include a collective carbon monoxide content of the first olefinic naphtha feedstream and first hydrogen-containing treat gas being less than 10 vppm.

Embodiment 3. The method of any previous embodiment wherein the first hydrotreating conditions are selected such that the first hydrotreating catalyst has a first relative hydrodesulfurization activity that is at least 20% greater than that of an identical catalyst under identical conditions except that the identical conditions include a collective carbon monoxide content of the first olefinic naphtha feedstream and first hydrogen-containing treat gas being less than 10 vppm.

Embodiment 4. The method of any previous embodiment further comprising contacting at least a portion of the first hydrotreated olefinic naphtha product stream with a second hydrogen-containing treat gas stream in the presence of a second hydrotreating catalyst in a second hydrotreating reactor under second hydrotreating conditions sufficient to at least partially hydrodesulfurize and/or hydrodenitrogenate the first hydrotreated olefinic naphtha product stream to produce a second hydrotreated olefinic naphtha product stream.

Embodiment 5. The method of any of embodiments 1-3 further comprising contacting the first hydrotreated olefinic naphtha product stream with a second hydrotreating catalyst, wherein the first hydrotreating catalyst and the second hydrotreating catalyst are in a stacked configuration within the first hydrotreating reactor such that the first hydrotreated olefinic naphtha product stream contacts the second hydrotreating catalyst to produce a second hydrotreated olefinic naphtha product stream which is withdrawn from the first hydrotreating reactor.

Embodiment 6. The method of any previous embodiment wherein the first olefinic naphtha feedstream is comprised of an FCC naphtha.

Embodiment 7. The method of any previous embodiment wherein the silica-based support comprises at least 85 wt % silica.

Embodiment 8. The method of any previous embodiment wherein the first hydrogen-containing treat gas stream has a carbon monoxide concentration of greater than 15 vppm.

Embodiment 9. The method of any previous embodiment wherein the first hydrotreating catalyst has a cobalt content from about 2 wt % to about 7 wt %, measured as oxide and based on total weight of the catalyst, and a molybdenum content from about 7 wt % to about 25 wt %, measured as oxide and based on total weight of the catalyst.

Embodiment 10. The method of any previous embodiment wherein the first hydrotreating catalyst has an average pore volume between about 0.6 cc/g and about 2.0 cc/g and an average pore diameter in the range of about 200 Å to 2000 Å.

Embodiment 11. The method of any previous embodiment wherein the first hydrotreating catalyst comprises at least one organic additive.

Embodiment 12. The method of any previous embodiment wherein the first olefinic naphtha feedstream and the first hydrogen-containing treat gas stream collectively have a carbon monoxide content of greater than 15 vppm.

Embodiment 13. The method of any previous embodiment wherein the first olefinic naphtha feedstream and the first hydrogen-containing treat gas stream collectively have a carbon monoxide content of greater than 25 vppm.

Embodiment 14. The method of any previous embodiment wherein the first olefinic naphtha feedstream and the first hydrogen-containing treat gas stream collectively have a $CO_x$ content from 15 vppm to 550 vppm.

Embodiment 15. The method of any one of embodiments 4-14 wherein the first hydrotreating catalyst converts at least 5% less carbon dioxide to carbon monoxide than the second hydrotreating catalyst at the same hydrotreating conditions.

Embodiment 16. The method of any one of embodiments 4-15 wherein the second hydrotreating catalyst comprises cobalt and molybdenum disposed on an alumina-based support wherein the alumina-based support contains at least 85 wt % alumina.

Embodiment 17. The method of embodiment 16 wherein the second hydrotreating catalyst has a cobalt content from about 0.1 wt % to about 5 wt %, measured as oxide and based on total weight of the catalyst, and a molybdenum content from about 1 wt % to about 10 wt %, measured as oxide and based on total weight of the catalyst.

Embodiment 18. The method of embodiment 17 wherein the second hydrotreating catalyst has an average pore volume between about 0.5 cc/g and about 1.5 cc/g and an average pore diameter in the range of about 60 Å to 200 Å.

EXAMPLES

Example 1

Exposure to CO

Figure 1:
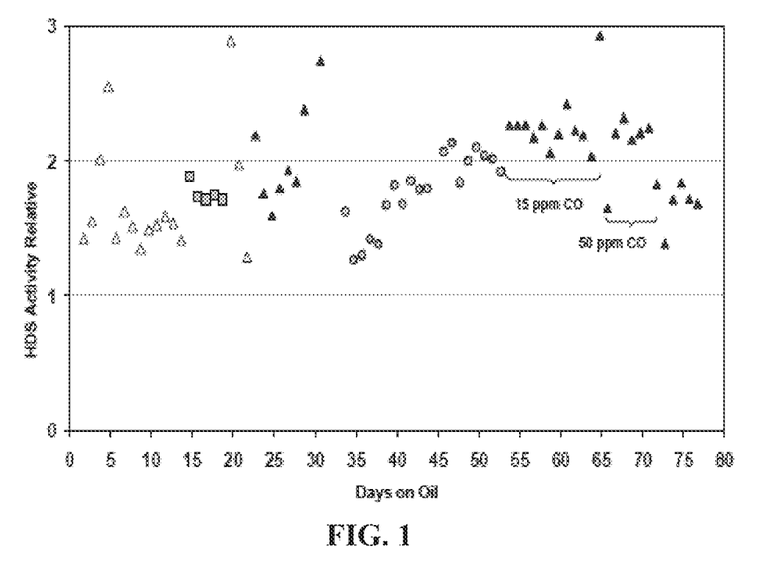
FIG. 1 shows a graph of catalytic hydrodesulfurization (HDS) activity versus days on oil for a hydrotreating catalyst according to the invention, relative to a conventional hydrotreating catalyst. At about 55 days on oil, the catalyst was subjected to a hydrogen treat gas containing about 15 vppm of carbon monoxide, as well as an olefinic naphtha feedstream. At about 65 days on oil, the catalyst was subject to a hydrogen treat gas containing about 50 vppm of carbon monoxide, as well as the olefinic naphtha feedstream. At about 72 days on oil, the treat gas was changed to pure hydrogen with no measurable carbon monoxide content.

In Example 1, pilot plant testing was done to simulate conditions in a single stage refinery hydrotreating unit for SCANfining, or selective hydrofining of a variety of catalytic (FCC) naphtha feedstreams. FIG. 1 shows hydrodesulfurization (HDS) activity data for a CoMo on silica supported hydrotreating catalyst, relative to an arbitrary hydrotreating catalyst baseline. The triangles in FIG. 1 indicate data using CoMo-silica with two different heavy cat naphtha (HCN) feeds; the squares in FIG. 1 indicate data using CoMo-silica with an intermediate cat naphtha (ICN) feed; and the circles in FIG. 1 indicate data using CoMo-silica with a light cat naphtha (LCN) feed. Up to about 55 days on oil in the pilot unit, ~100% hydrogen gas was used as the treat gas at approximately 515-535° F. (about 268-279° C.), a reaction pressure of about 230-300 psig (about 1.6-2.1 MPag), an LHSV of about 4-10 $hr^{-1}$, and a treat gas rate of about 1200-1800 scf/bbl (about 200-310 $Nm^3/m^3$). At about 55 days on oil, the ~100% hydrogen gas was switched to a hydrogen treat gas containing about 15 vppm of carbon monoxide; at about 65 days on oil, the hydrogen treat gas was switched to contain about 50 vppm of carbon monoxide; then at about 72 days on oil, the treat gas was changed back to ~100% hydrogen with no measurable carbon monoxide content; and the pilot plant run ended at about 77 days on oil.

Of particular interest on this graph is the increase in relative HDS activity of the CoMo-silica (compared to a conventional "baseline" supported CoMo alumina catalyst), when exposed to about 15-50 vppm carbon monoxide. This is highlighted by the jog lower in relative HDS activity after the carbon monoxide content was removed toward the end of the run. This data show approximately a 20-25% increase in relative HDS activity for the CoMo-silica (again, in comparison to a less CO-tolerant conventional CoMo-alumina catalyst) that disappeared when the CO was removed. As carbon monoxide is a known suppressant for heteroatom removal processes such as hydrodesulfurization, this relative increase in activity indicates a slower deactivation rate in the presence of CO, as compared to the less CO-tolerant hydrotreating catalyst.

Example 2

Exposure to $CO_2$

In Example 2, a comparison is made between two supported CoMo hydrotreating catalysts, a supported CoMo on silica and a supported CoMo on alumina, in a pilot plant study testing the effect of carbon dioxide on SCANfining of ICN product having the characteristics set forth in Table 1 below.

TABLE 1

| Feedstock Number Source Description | |
|---|---|
| API GRAVITY | 53.6 |
| SULFUR, wppm | 1487 |
| BROMINE NUMBER | 66.2 |
| MERCAPTAN SULFUR, wppm | 22.3 |
| GCD, ° F. | |
| 0.5 VOL % (IBP) | 138 |
| 5.0 VOL % | 149 |
| 10.0 VOL % | 158 |
| 30.0 VOL % | 186 |
| 50.0 VOL % | 210 |
| 70.0 VOL % | 242 |
| 90.0 VOL % | 323 |
| 95.0 VOL % | 359 |
| 99.5 VOL % (FBP) | 454 |

Temperatures in the pilot study ranged from about 525° F. (about 274° C.) to about 550° F. (288° C.). In order to maintain a treat gas rate of about 2000 scf/bbl (about 340 $Nm^3/m^3$), the CoMo-silica pilot unit was exposed to an LHSV of about 3.3 $hr^{-1}$, and the CoMo-alumina pilot unit was exposed to an LHSV of about 2 $hr^{-1}$ at about 230 psig (about 1.6 MPag). Pure hydrogen treat gas in each case was spiked with about 500 vppm of carbon monoxide to test the inclination of each catalyst to form CO from $CO_2$.

Figure 2:
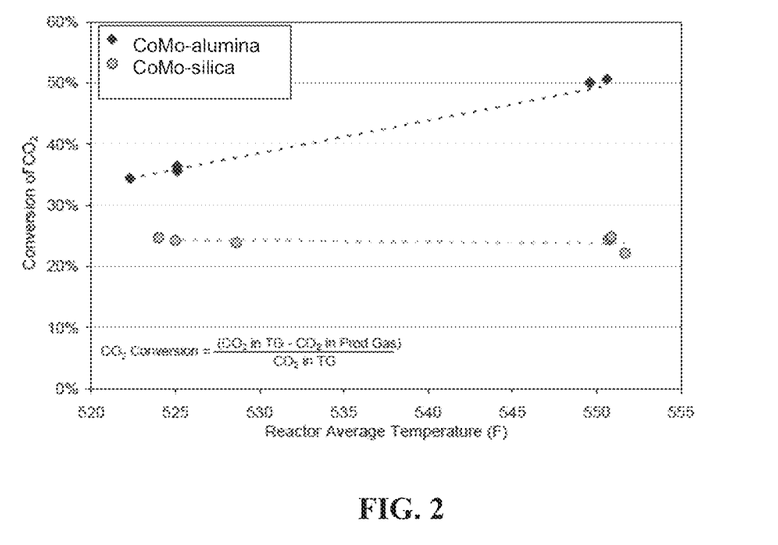
FIG. 2 shows a graph of catalytic conversion of carbon dioxide (present in the hydrogen treat gas stream in about 500 vppm) versus average reactor temperature for a hydrotreating catalyst according to an embodiment of the invention and for a conventional hydrotreating catalyst.

FIG. 2 shows graphically the results of conversion versus average reaction temperature for CoMo-silica and CoMo-alumina. It can be seen that the CoMo-silica showed about 10-25% less conversion of $CO_2$ into CO than the CoMo-alumina. Additionally, the CoMo-silica conversion level did not substantially change over the given temperature range, while the CoMo-alumina conversion level increased markedly. This finding indicates that the benefit of reduced CO make increases with the CoMo-silica at higher temperatures (more severe conditions).

The principles and modes of operation of this invention have been described above with reference to various exemplary and preferred embodiments. As understood by those of skill in the art, the overall invention, as defined by the claims, can encompass other preferred embodiments not specifically enumerated herein.

What is claimed is:

1. A method of hydrotreating an olefinic naphtha feedstream in the presence of an increased carbon monoxide content, the method comprising:
    contacting a first olefinic naphtha feedstream with a first hydrogen-containing treat gas stream in the presence of a first hydrotreating catalyst in a first hydrotreating reactor under first hydrotreating conditions sufficient to at least partially hydrodesulfurize and/or hydrodenitrogenate the first olefinic naphtha feedstream to produce a first hydrotreated olefinic naphtha product stream; and contacting at least a portion of the first hydrotreated olefinic naphtha product stream with a second hydrogen-containing treat gas stream in the presence of a second hydrotreating catalyst under second hydrotreating conditions sufficient to at least partially hydrodesulfurize and/or hydrodenitrogenate the first hydrotreated olefinic naphtha product stream to produce a second hydrotreated olefinic naphtha product stream, wherein the first olefinic naphtha feedstream and the first hydrogen-containing treat gas stream collectively have a carbon monoxide content of greater than 10 vppm and a carbon dioxide content of greater than 15 vppm;

wherein the first hydrotreating catalyst converts at least 5% less carbon dioxide to carbon monoxide than the second hydrotreating catalyst at the same hydrotreating conditions; and wherein the first hydrotreating catalyst comprises cobalt and molybdenum disposed on a silica-based support.

2. The method of claim 1, wherein the first hydrotreating conditions are selected such that the first hydrotreating catalyst has a first relative hydrodesulfurization activity that is at least 10% greater than that of an identical catalyst under identical conditions except that the identical conditions include a collective carbon monoxide content of the first olefinic naphtha feedstream and first hydrogen-containing treat gas being less than 10 vppm.

3. The method of any of claims 1 or 2, wherein the first olefinic naphtha feedstream is comprised of an FCC naphtha.

4. The method of claim 3, wherein the silica-based support comprises at least 85 wt% silica.

5. The method of claim 4, wherein the first hydrogen-containing treat gas stream has a carbon monoxide concentration of greater than 15 vppm.

6. The method of claim 4, wherein the first hydrotreating catalyst has a cobalt content from about 2 wt% to about 7 wt%, measured as oxide and based on total weight of the catalyst, and a molybdenum content from about 7 wt% to about 25 wt%, measured as oxide and based on total weight of the catalyst.

7. The method of claim 6, wherein the first hydrotreating catalyst has an average pore volume between about 0.6 cc/g and about 2.0 cc/g and an average pore diameter in the range of about 200 Å to 2000 Å.

8. The method of claim 7, wherein the first hydrotreating catalyst comprises at least one organic additive.

9. The method of claim 8, wherein the first olefinic naphtha feedstream and the first hydrogen-containing treat gas stream collectively have a carbon monoxide content of greater than 15 vppm.

10. The method of claim 9, wherein the first olefinic naphtha feedstream and the first hydrogen-containing treat gas stream collectively have a carbon monoxide content of greater than 25 vppm.

11. The method of claim 2, wherein the first hydrotreating conditions are selected such that the first hydrotreating catalyst has a first relative hydrodesulfurization activity that is at least 20% greater than that of an identical catalyst under identical conditions except that the identical conditions include a collective carbon monoxide content of the first olefinic naphtha feedstream and first hydrogen-containing treat gas being less than 10 vppm.

12. The method of claim 1, wherein the at least a portion of the first hydrotreated olefinic naphtha product stream is contacted with the second hydrogen-containing treat gas stream in the presence of the second hydrotreating catalyst in a second hydrotreating reactor.

13. The method of claim 2, wherein the at least a portion of the first hydrotreated olefinic naphtha product stream is contacted with the second hydrogen-containing treat gas stream in the presence of the second hydrotreating catalyst in a second hydrotreating reactor.

14. The method of any of claim 12 or 13, wherein the first olefinic naphtha feedstream is comprised of an FCC naphtha.

15. The method of claim 14, wherein the silica-based support comprises at least 85 wt% silica.

16. The method of claim 15, wherein the first hydrogen-containing treat gas stream has a carbon monoxide concentration of greater than 15 vppm.

17. The method of claim 15, wherein the first hydrotreating catalyst has a cobalt content from about 2 wt% to about 7 wt%, measured as oxide and based on total weight of the catalyst, and a molybdenum content from about 7 wt% to about 25 wt%, measured as oxide and based on total weight of the catalyst.

18. The method of claim 17, wherein the first hydrotreating catalyst has an average pore volume between about 0.6 cc/g and about 2.0 cc/g and an average pore diameter in the range of about 200 Å to 2000 Å.

19. The method of claim 18, wherein the first hydrotreating catalyst comprises at least one organic additive.

20. The method of claim 19, wherein the first olefinic naphtha feedstream and the first hydrogen-containing treat gas stream collectively have a carbon monoxide content of greater than 15 vppm.

21. The method of claim 20, wherein the first olefinic naphtha feedstream and the first hydrogen-containing treat gas stream collectively have a carbon monoxide content of greater than 25 vppm.

22. The method of claim 19, wherein the second hydrotreating catalyst comprises cobalt and molybdenum disposed on an alumina-based support Wherein the alumina-based support contains at least 85 wt% alumina.

23. The method of claim 22, wherein the second hydrotreating catalyst has a cobalt content from about 0.1 wt% to about 5 wt%, measured as oxide and based on total weight of the catalyst, and a molybdenum content from about 1 wt% to about 10 wt%, measured as oxide and based on total weight of the catalyst.

24. The method of claim 23, wherein the second hydrotreating catalyst has an average pore volume between about 0.5 cc/g and about 1.5 cc/g and an average pore diameter in the range of about 60 Å to 200 Å.

25. The method of claim 24, wherein the first olefinic naphtha feedstream and the first hydrogen-containing treat gas stream collectively have a $CO_x$ content from 15 vppm to 550 vppm.

26. The method of claim 1, wherein the first hydrotreating catalyst and the second hydrotreating catalyst are in a stacked configuration within the first hydrotreating reactor such that the first hydrotreated olefinic naphtha product stream contacts the second hydrotreating catalyst to produce a second hydrotreated olefinic naphtha product stream Which is withdrawn from the first hydrotreating reactor.

27. The method of claim 26, wherein the first hydrotreating catalyst has a cobalt content from about 2 wt% to about 7 wt%, measured as oxide and based on total weight of the catalyst, and a molybdenum content from about 7 wt% to about 25 wt%, measured as oxide and based on total weight of the catalyst.

28. The method of claim 27, wherein the first hydrotreating catalyst has an average pore volume between about 0.6 cc/g and about 2.0 cc/g and an average pore diameter in the range of about 200 Å to 2000 Å.

29. The method of claim 28, wherein the first hydrotreating catalyst comprises at least one organic additive.

30. The method of claim 29, wherein the first olefinic naphtha feedstream and the first hydrogen-containing treat gas stream collectively have a carbon monoxide content of greater than 15 vppm.

31. The method of claim 30, wherein the first olefinic naphtha feedstream and the first hydrogen-containing treat gas stream collectively have a carbon monoxide content of greater than 25 vppm.

32. The method of claim 29, wherein the second hydrotreating catalyst comprises cobalt and molybdenum disposed on an alumina-based support wherein the alumina-based support contains at least 85 wt% alumina.

33. The method of claim 32, wherein the second hydrotreating catalyst has a cobalt content from about 0.1 wt% to about 5 wt%, measured as oxide and based on total weight of the catalyst, and a molybdenum content from about 1 wt% to about 10 wt%, measured as oxide and based on total weight of the catalyst.

34. The method of claim 33. wherein the second hydrotreating catalyst has an average pore volume between about 0.5 cc/g and about 1.5 cc/g and an average pore diameter in the range of about 60 Å to 200 Å.

* * * * *